United States Patent

Basa

[15] 3,706,202
[45] Dec. 19, 1972

[54] MANUALLY OPERATED FLUID PRESSURE DRIVEN ROTARY DRIVE

[72] Inventor: Napoleon A. Basa, 46 Cordillers Street, Quezon City, Philippines

[22] Filed: Nov. 16, 1970

[21] Appl. No.: 89,760

[52] U.S. Cl.................60/54.5 R, 74/661, 74/665 D
[51] Int. Cl................................................F15b 7/00
[58] Field of Search.....60/54.5 R; 74/88, 89.14, 665, 74/661

[56] References Cited

UNITED STATES PATENTS

| 3,418,807 | 12/1968 | Frost | 60/54.6 R |
| 2,793,876 | 5/1957 | Allwes | 60/54.5 R |
| 2,250,734 | 7/1941 | Thompson et al. | 60/54.5 R |
| 2,339,132 | 1/1944 | Arnot | 60/54.5 R |
| 1,267,855 | 5/1918 | Dorah | 74/665 D |
| 3,576,106 | 4/1971 | Nowicki | 74/661 |

Primary Examiner—Edgar W. Geoghegan
Assistant Examiner—A. M. Zupcic
Attorney—Imirie and Smiley

[57] ABSTRACT

Manually operated single or multiple fluid motors for generating fluid pressure and driving a reciprocating servo motor having a screw like reciprocating force transmitting element and a rotary power take off member connected to a coupler or transmission for use as an auxiliary or primary drive for various work devices.

5 Claims, 8 Drawing Figures

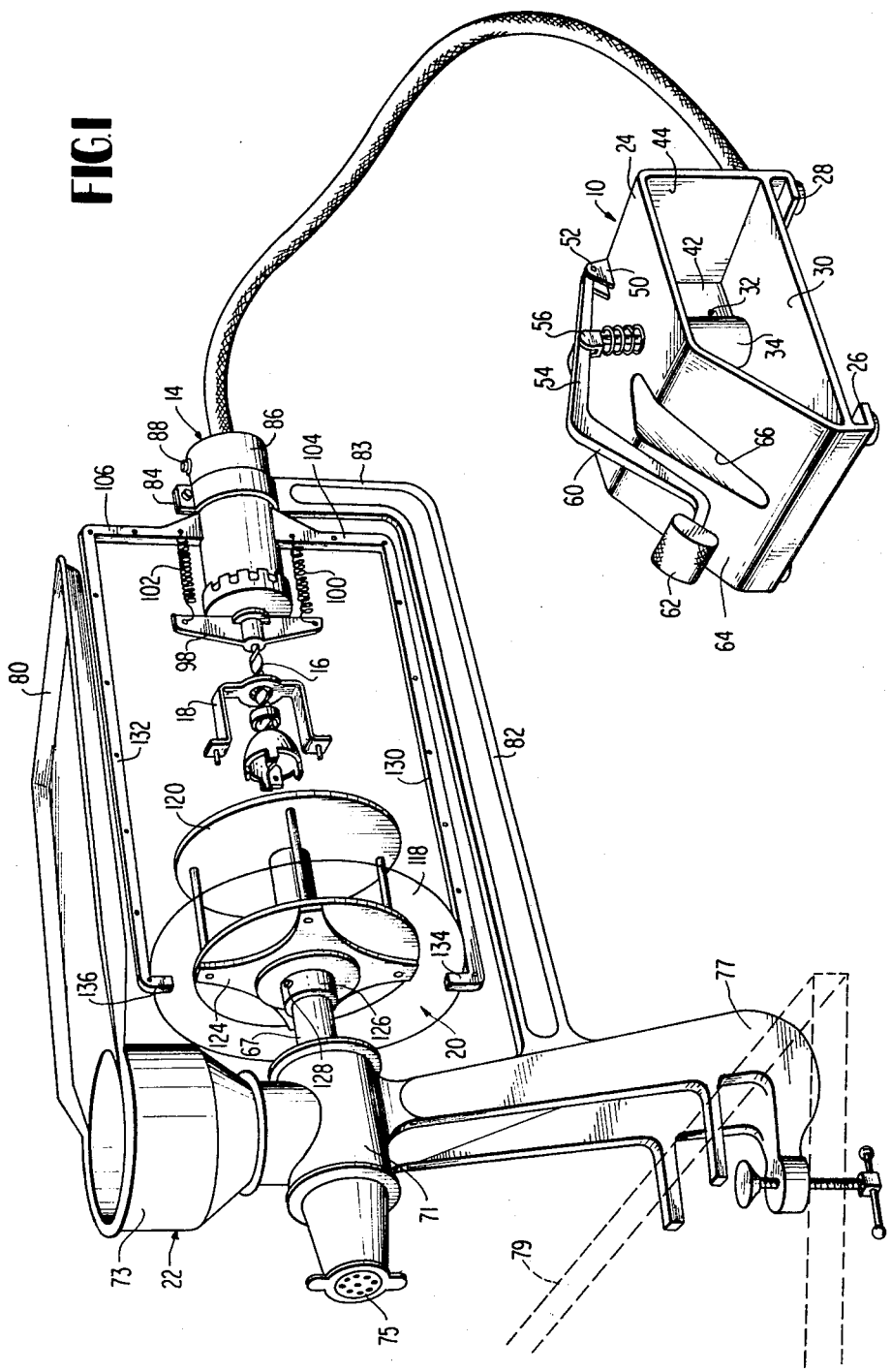

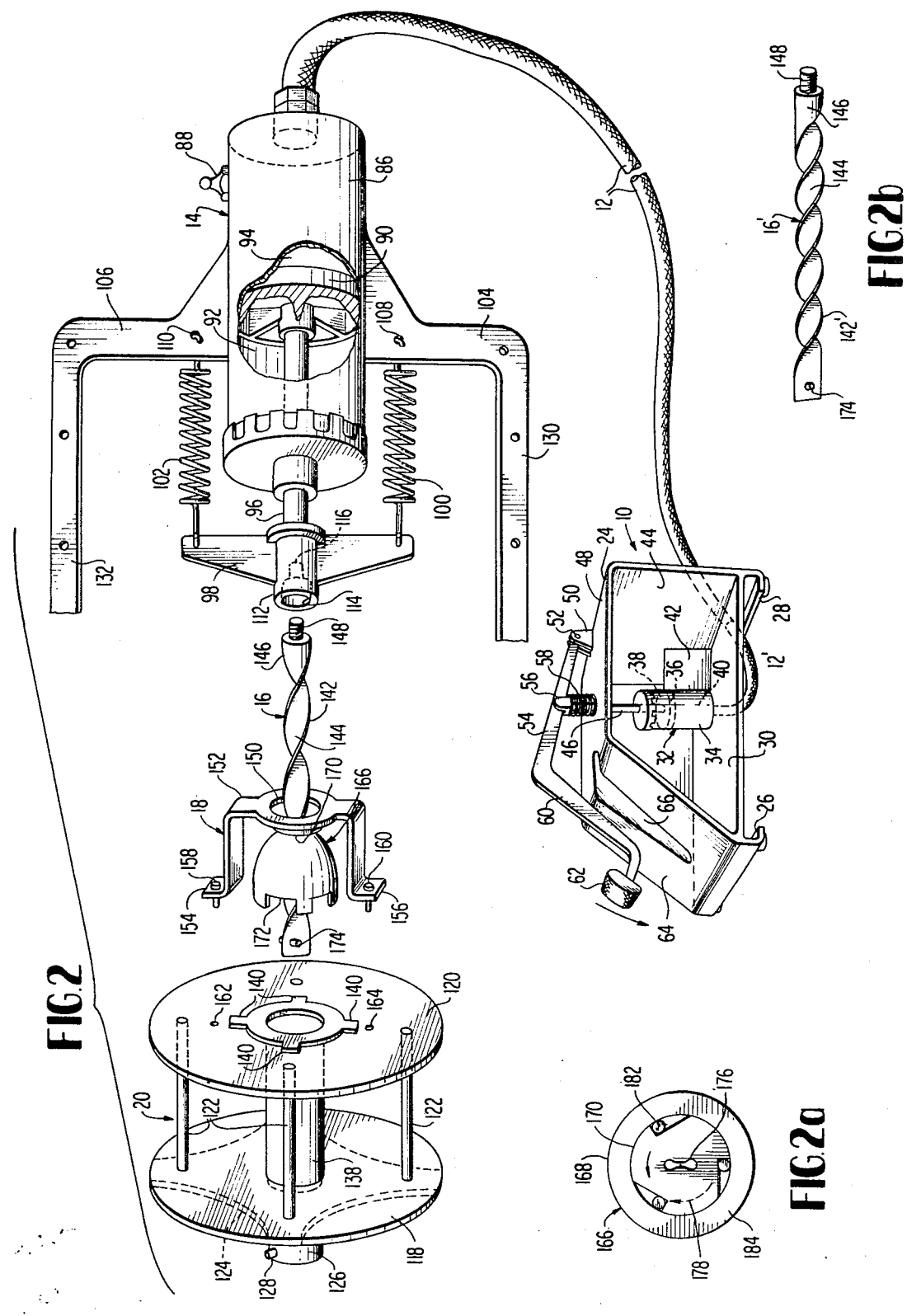

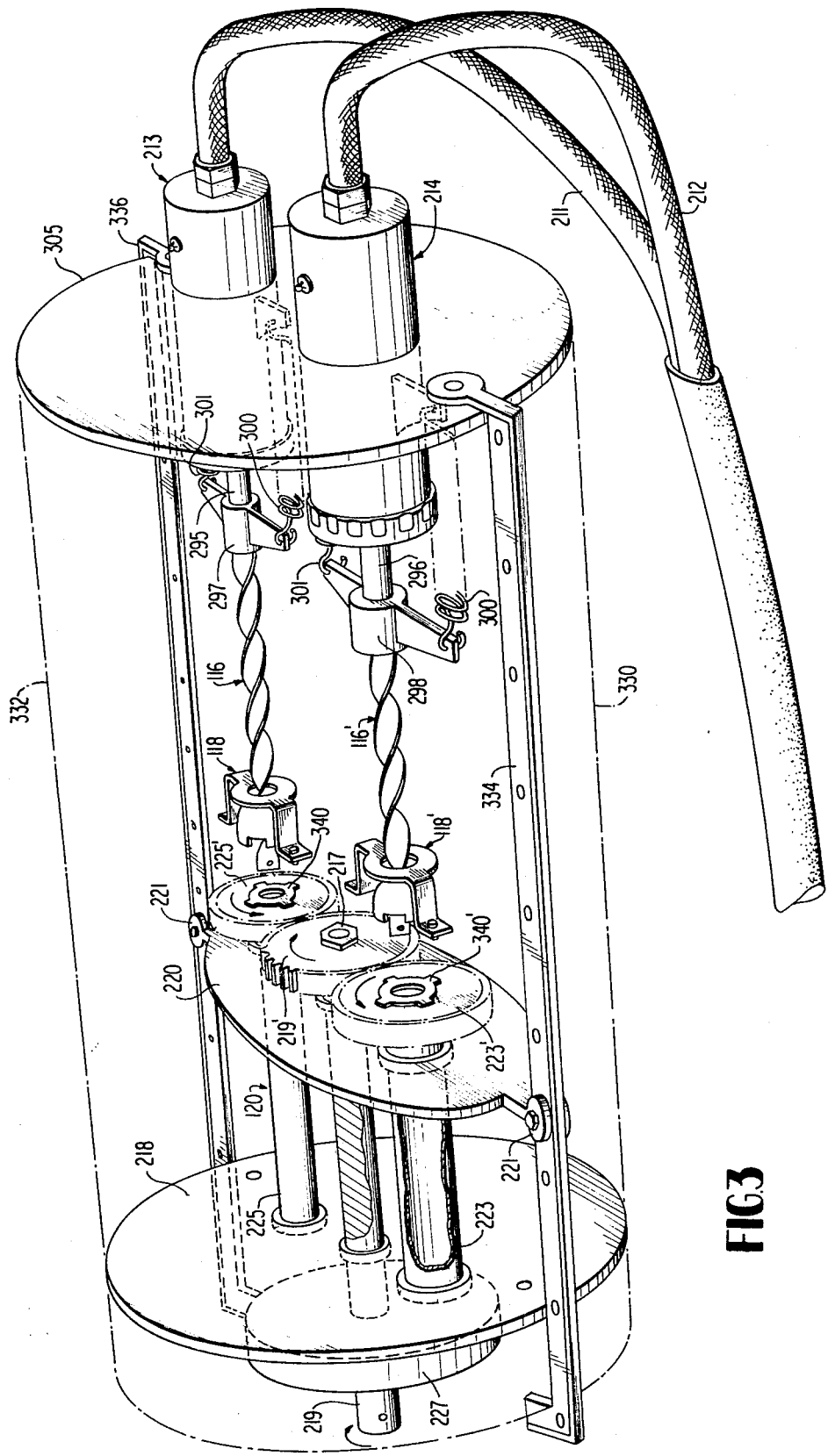

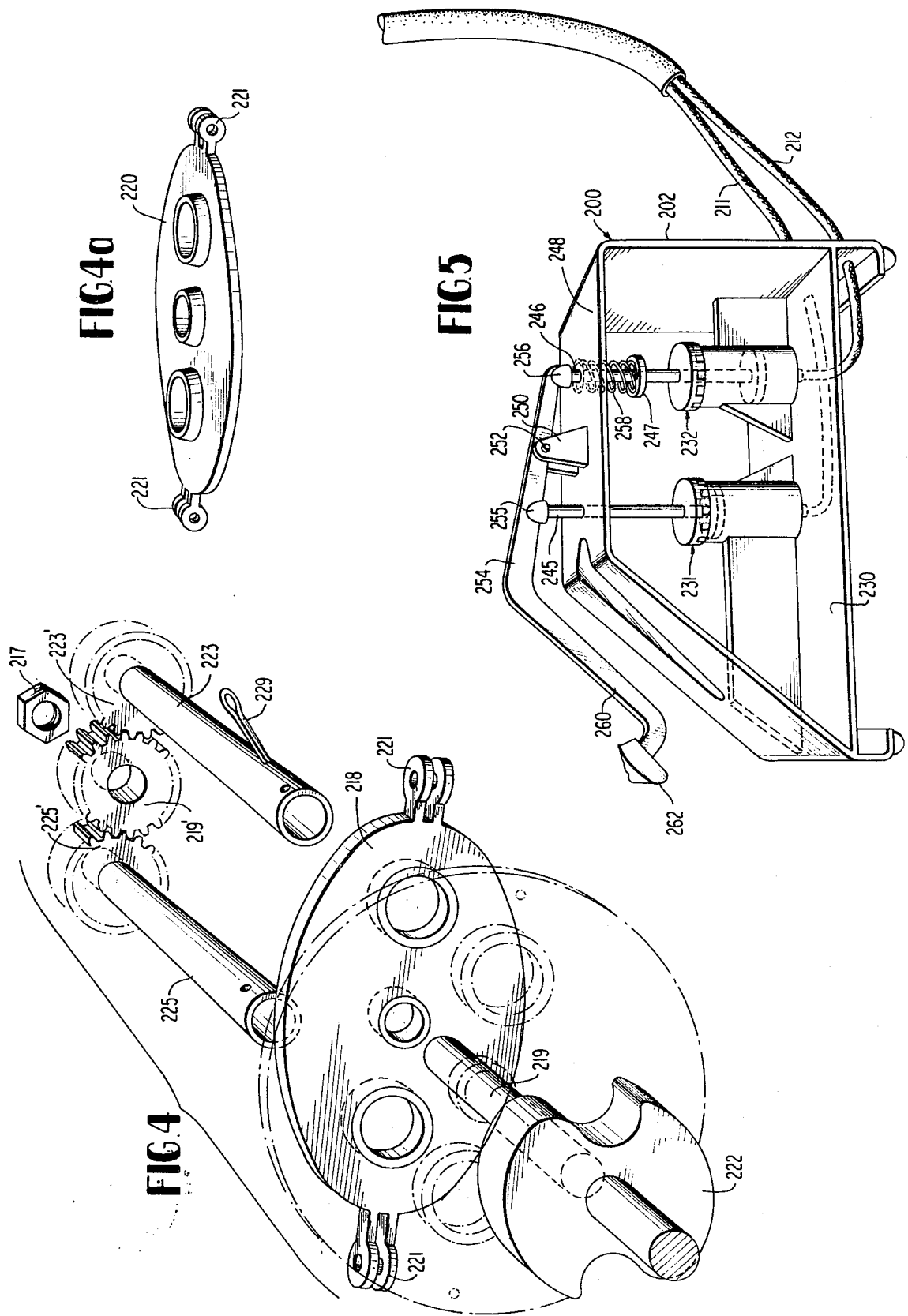

3,706,202

MANUALLY OPERATED FLUID PRESSURE DRIVEN ROTARY DRIVE

BACKGROUND OF THE INVENTION

This invention relates to fluid pressure drives and more particularly to manually operated power drives utilizing fluid motors for driving a servo motor which in turn drives a reciprocating force transmitting member including means for converting reciprocating movement to rotary movement.

In technically advanced countries, many conveniences of modern society are taken for granted. It takes only an electrical power failure, break down of the internal combustion engine of an automobile and the myriad of ecological problems relating to waste products of combustion, contamination of the atmosphere and water to appreciate that there is a continuing demand for non-contaminating power drives for various work devices, which are adaptable in rural areas that do not have the advantages of technical advancement and also have a place in a highly developed urban society.

BRIEF SUMMARY OF THE INVENTION

The invention relates to a manually operated fluid pressure generator which is operatively connected to a remote servo motor which in turn transmits reciprocating force to a converter to provide a rotary power take off for driving various work devices such as cement mixers, vegetable choppers, food grinders, washing machines, ice cream mixers, potato peelers, and which also can serve as an auxiliary power source for an automotive vehicle in case the primary power source fails.

BRIEF DESCRIPTION OF THE DRAWINGS

FIG. 1 is a partially exploded perspective view showing one embodiment of the fluid pressure operated rotary drive when used to operate a food grinder;

FIG. 2 is an enlarged exploded view of parts of FIG. 1;

FIG. 2A is a front elevational view of a one way clutch drive used to obtain one way rotation in the embodiment of FIG. 1;

FIG. 2B is a side view in elevation of an alternate power screw used to obtain a power output ratio different than the device of FIG. 1;

FIG. 3 is a perspective view of another embodiment of the fluid pressure operated drive;

FIG. 4 is an exploded perspective view of the gear train of FIG. 3;

FIG. 4A is a perspective view of a shaft support and gear gapping plate, and

FIG. 5 is a fragmentary perspective view showing the manually operated fluid pressure generator used with the embodiment of FIG. 3.

DETAILED DESCRIPTION OF THE PREFERRED EMBODIMENTS

Considering FIGS. 1–2B, a relatively elementary embodiment of the invention is disclosed in relation to a food grinder which is one of the class of relatively small implements which are readily portable. This type of apparatus is one of a group which might benefit people in rural areas where electrical power is not available and is also practical for troops in the field.

Referring to FIG. 1, a manually operated fluid pressure generator is indicated generally at 10 and is in fluid communication through a suitable conduit 12 with a hydraulically operated servo motor assembly indicated at 14. The servo motor assembly 14 is connected through a force transmitting member 16 to a coupler assembly 18 for converting reciprocating motion to rotary motion. The coupling assembly 18 includes a power output or drive portion 20 which is connected to the power input shaft of a work device such as a food grinder indicated at 22.

The manually operated fluid pressure generator 10 is disclosed as a foot operated device, however, a hand operated lever can be substituted for that shown in this embodiment. The fluid pressure generator 10 comprises a housing 24 having lower inwardly directed support flanges 26 and 28 for providing a stable base. The housing includes a transverse bottom wall 30 which includes, extending vertically therefrom, a fluid motor or hydraulic piston 32 which includes an outer housing or casing 34 having reciprocably disposed therein a piston 36 defining on opposite sides thereof variable volume upper and lower chambers 38 and 40. The cylinder 34 is stabilized or reinforced by one or more webs such as web 42 secured to the cylinder 34 and the inner surface of the rear wall 44 of housing 24.

Piston 36 has extending therefrom a force transmitting or piston rod 46 projecting through a suitably apertured portion of the top wall 48 of the housing. Integral with the top wall 48 and adjacent the rear wall 44 is a bifurcated bracket 50 through which extends a pivot pin 52 upon which is pivotally mounted a Z-shaped lever 54, the upper end of piston rod 46 pivotally abutting the lever 54 at 56, and a return spring 58 being circumposed about the rod an interposed between the lever 54 and the upper surface of the top wall 48 of the housing. The lever 54 has a downwardly extending portion 60 terminating in an outwardly disposed foot engageable pedal 62. The housing 24 includes an angular forward wall 64 having an intermediate groove 66 into which lever portion 60 moves.

Variable volume chamber 40 is connected at its lower end to a portion 12' of the fluid conduit 12 and downward movement of the piston 36 will cause the fluid in the variable volume chamber 40 to be forceably urged through the fluid conduit 12. Lever 54 is a third class lever in which the pivot 52 comprises the fulcrum, and force is applied to the piston rod 46 when food pedal 62 is depressed. The return spring 58 urges the lever to approximately the position shown after each downward stroke. Although the fluid pressure generator is disclosed as a single acting fluid motor which is operated by a foot pedal, the lever 54, with slight modifications (not shown) could be a hand operated lever, and other types of manually operated fluid pressure generators may be utilized.

Before describing the servo motor assembly 14, force transmitting member 16 and coupling assembly 18 in detail, the work device or food grinder apparatus 22 is typical of many relatively portable devices which can be driven or operated by the fluid pressure driven rotary drive of the invention.

As seen in FIG. 1, the food grinder may conveniently include a food support tray 80 and a rearwardly projecting detachable (if desired) support arm 82 including an upwardly projecting arm 83 terminating in a clamping collar 84. The clamping collar 84 will removably support the servo motor assembly 14 and other cooperating components as will be described.

The servo motor assembly 14 includes a cylindrical housing 86 having a rear plug 88 used to bleed air from the system as well as replenish the fluid supply. Disposed in the cylindrical housing 86 and seen in FIG. 2 is a piston 90 defining forward and rear variable volume chambers 92 and 94, respectively. The piston 90 has secured thereto a forwardly projecting, axial force transmitting rod 96 carrying on its forward end a mounting member 98 which extends diammetrically thereof, and which has connected to the distal ends thereof terminal ends of tension springs 100 and 102.

Integral with the housing 86 and in diammetrical relationship are bracket elements 104 and 106 suitably apertured at 108 and 110, in which the tension springs 100 and 102 are anchored. As fluid pressure is generated at the fluid motor 32, as previously described, the piston 90 will be urged forward in opposition to the tension springs 100 and 102 which comprise return springs urging the element 98 to the nonactivated position as shown in FIG. 2. The mounting member 98 includes an axial sleeve portion 112 having an axial bore 114 terminating in an inner tapped bore 116 to facilitate mounting of the power screw 16.

The drive coupler comprises a pair of spaced discs 118 and 120 retained in spaced parallel relation by assembly rods 112 suitably secured at opposite ends to the discs. The forward disc 118 incorporates a reinforcing spider 124 which includes an axial hub or mounting sleeve 126 telescopically receiving the drive shaft 67 of the food grinder therein, and these elements are retained in assembled relationship by means of a transverse lock screw 128 extending through the hub 126.

The bracket elements 104 and 106 include forwardly extending portions 130 and 132, terminating in inwardly turned portions 134 and 136 suitably secured to diammetrically opposed portions of disc 118 as seen in FIG. 1. The discs 118 and 120 have a central tubular shaft or hub 138 extending axially therebetween, the rear portion of the hub including at each quadrant radially extending drive lugs 140.

The power screw 16 comprises an elongated member 142 having an outer thread 144 of a relatively shallow pitch. The rear end of the power screw is generally cylindrical at 146 and terminates in a threaded stud 148, these parts being received in the bore portions 114 and 116, respectively. In this regard, although a specific means for securing the power screw in bore portions 114, 116 is disclosed as an example, other correspondingly functional connection means may be utilized. The power screw extends through a centrally apertured portion 150 of a U-shaped bracket 152 comprising portions of the coupler assembly 18. The bracket 152 includes forward foot portions 154 and 156 which have extending through apertured portions thereof mounting elements such as machine screws, 158 and 160 which engage tapped, diammetrically opposed apertures 162 and 164, respectively. Forward of the apertured portion 150 of the bracket 152 is a one way clutch drive indicated at 166 and including a dome-shaped hub 168 and a one way clutch 170. The hub 168 includes circumferentially spaced notches 172 accommodating therein the respective lugs 140, and the bracket 152 retains the lugs 140 in driving engagement in the notches 172. The forward end of the power screw has a transverse abutment element 174 to prevent inadvertent disassembly of the cooperating parts.

The one way clutch 170 comprises a central hour glass-shaped aperture 176 as seen in FIG. 2A, through which the screw portion 144 of the power screw extends. The hour glass aperture is formed in a peripherally notched, suitably retained disc 178 having a plurality of L-shaped notches 180 in the outer periphery thereof and displaceable roller elements 182 are disposed in the notches for engagement with the inner surface of an annular ring 184 fixed to the dome 168. See U.S. Pat. No. 1,460,201 to Leopole, for example.

When the disc 178 is rotated in the direction shown by the solid arcuate direction arrow, the roller elements 182 ride outwardly in the notches 180 and frictionally engage to drive the hub 168 in the solid line direction as shown. Reverse rotation of the disc 178 as seen by the dotted arrow results in slipping of the disc 178 with respect to the driving hub 168 and thus the hub 168, which is drivingly connected to the lugs 140, only rotates the drive coupler 20 in a single direction. This affords a step by step rotation of the shaft 67 of the food grinder 22.

If one desires oscillatory motion, the one way clutch drive would be eliminated and the drive hub 168 would rotate the drive coupler 20 during both extension and retraction strokes of the force transmitting piston rod of the servo motor assembly 14. Oscillation of the lever 54 results in the generation of fluid pressure at the fluid motor 32, correspondingly driving the servo motor assembly 14. The return springs 58 and 100, 102, cause the return of the pistons to a nonactivated position. The embodiment described accordingly is a manually operated and a conversion method, through the use of fluid pressure, of converting reciprocating motion to circular motion.

Referring to FIG. 2B, an alternate power screw is illustrated, and correspondingly similar portions are identified by similar reference numerals. It will be noted that the member 142' has a pitch 144' which is not as shallow as that of the power screw 16, for a given amount of distance of reciprocation, the power screw 16' will cause a faster speed of rotation of the drive coupler than the greater pitched power screw 60.

The machine of FIG. 1 includes a one way driven shaft. As mentioned, the manually operated fluid pressure driven rotary drive could be used in devices in which oscillatory movement is desired.

Referring to FIGS. 3–5, there is disclosed a double acting assembly incorporating certain features of the embodiment of FIGS. 1 and 2, and primary distinguishable features include the fact that the rotary movement is continuous rather than step by step, as in the first disclosed embodiment. This continuous rotary movement is supplemented by a fly wheel or weight affording smooth transition of driving force when utilizing a pair of power drive screws which are alternately rotated.

Referring to FIG. 5, a double acting fluid pressure generator is indicated generally at 200. The fluid pressure generator 200 comprises a skeletonized housing of suitable weight and produced from a suitable material as indicated at 202. Extending vertically from a bottom wall 230 are suitably supported and reinforced fluid motors 231 and 232. The fluid motors 231 and 232 are respectively connected to fluid conduits 211 and 212 and incorporate in a cylindrical housing reversely disposed pistons defining variable volume chambers. The pistons have extending vertically force transmitting or piston rods 245 and 246, and rod 246 has disposed intermediately thereof an abutment disc 247 against which one end of a coil spring 258 engages, the other end of the spring engaging the under surface of the top wall 248 of the housing. A bifurcated fulcrum or support 250 has a pivot pin 252 extending therethrough, and pivotally supporting manually actuated lever 254. The upper ends of rods 245 and 246 pivotally engage in accommodating sockets 255 and 256, respectively, formed integral with the lever 254, and the lever includes an extension 260 terminating in a lateral lever or pedal 262.

Without describing in detail the servo motors driven by the respective fluid motors 231 and 232, it will be observed that the fluid motors 231 and 232 are alternately functionable to drive fluid pressure in the respective conduits 211 and 212, and thus there is double action fluid pressure generation and the lever 254 is urged to the normal position illustrated in FIG. 5 by the return spring 258. If necessary, a supplemental return spring could be circumposed about the upper end of piston rod 245, similar to the embodiment of FIG. 1.

The embodiment of FIG. 5 could be hand operated rather than foot operated as shown. Additionally, since two fluid motors are involved in the embodiment of FIG. 5, more energy must be expended to generate the fluid pressure as the lever 245 is oscillated about its pivot 252.

Referring to FIG. 3, a pair of servo motor assemblies 213 and 214 are respectively operatively connected to the fluid conduits 211 and 212 and function in the manner previously described with respect to the servo motor assembly 14. The motors 213 and 214 are mounted on a support plate 205 which comprises the rear end of a housing including semicylindrical mating portions 330 and 332 which include laterally projecting side flanges 334 and 336 for mounting the power unit on a suitable support frame.

The servo motor assemblies 213 and 214 respectively include piston rods 295 and 296 having transverse mounting members 297 and 298 to which are connected pairs of return springs 300 and 301 functioning in the same manner in the servo motor assembly 14 of FIG. 2. Detachably connected to the mounting members 297 and 298 are power screws 116 and 116', which in turn, are operatively connected to coupler assemblies 118 and 118'. The coupler assemblies 118 and 118' will include one way clutches similar to that of FIG. 2A, and in all respects function as does the previously described apparatus. The only exception is that the fluid pressure generators 231, 232 and servo motor assemblies 213 and 214 are 180° out of phase with respect to each other. Thus, when one power screw 116 is being extended, the other power screw 116' is being retracted.

The power screws 116 and 116' are operatively connected to a drive coupler assembly indicated generally at 18a and in the instant case comprise a transmission for driving a power output shaft in a single direction of rotation.

The coupler assembly 220 includes a rear gapping plate 220 and a forward mounting plate 218, each being suitably secured in transverse relation to the housing by means of mounting assemblies and machine screws 221. The plates 218 and 220 will include suitable bearings such as double sealed ballbearings, for example, accommodating an axial power output shaft 219 which is flanked by drive shafts or tubes 223 and 225. Secured to the rear end of shaft 219 is a sun gear 219' retained on the shaft by means of a lock nut 217. The drive shafts or tubes 223 and 225 have suitably secured on the rear ends thereof pinion gears 223' and 225', and on the rear faces thereof is an element having at the various quadrants radially projecting lugs 340 and 340' cooperating with the drive hub as in the embodiments of FIGS. 1 and 2. Suitably secured to the power output 219 forward of the plate 218 is a fly wheel 227 as seen in FIG. 4.

It is evident that the transmission or drive of FIG. 3–5 can be utilized for operating a food grinder or similar apparatus in which the shaft is driven in only a single direction. As the fluid motors 231 and 232 are alternately reciprocated, pressure is directed to the servo motor assemblies 213 and 214, alternately rotating the pinion or drive gears 223', 225' for driving the sun gear 219' and the power output shaft 219 in a single direction. The smooth transition of driving is promoted by inertial forces on the fly wheel 227 on the forward end of the shaft.

Whereas the drive system of the present invention is shown in FIG. 1 as adapted to a food grinder, it will be understood that it may be adapted for any type of device requiring a drive mechanism. For example, it may be adapted for all types of appliances and also for vehicles of various types. If desired, a change speed mechanism or reversing mechanism may be introduced between the drive mechanism and the propeller shaft. In the latter event, suitable braking means for the propeller shaft will be provided. This could be of the mechanically or hydraulically operated types, and they would either be automatically or manually applied to stop the propeller shaft when shifting from forward to reverse driving relationships of the gears.

I claim:

1. A manually operated fluid pressure drive comprising a fluid motor means including a first pair of parallel piston and cylinder assemblies operating 180° out of phase with respect to each other; a single pivotal foot actuated pedal member operatively connected to the pistons of said assemblies for alternately actuating the pistons in the cylinders; spring means operatively connected to the pistons for moving the pistons in the opposite direction from the direction of movement produced by the foot operation of the pedal member; a servo motor means including a second pair of parallel piston and cylinder assemblies operating 180° out of phase with respect to each other and disposed in side by side relation; one of each of said second piston and cylinder assemblies being in fluid connection with one of said first mentioned piston and cylinder assemblies and being actuated in power strokes by fluid pressure therefrom; spring means operatively connected to the pistons of said second piston and cylinder assemblies for moving the pistons in return strokes; said servo motor means further including a mounting member, elongated power screws extending axially in parallel side by side relation from the respective cylinder assemblies of the second pair and each being respectively attached at one end to its associated piston and supported for reciprocal and rotational bodily movement by said mounting member; drive coupler means operatively connected to said power screws and supported by said mounting member for changing reciprocating movement thereof to rotary movement, and a power take off means continuously driven by said drive coupler means for transmitting torque.

2. The combination of claim 1, in which said drive coupler means comprises drive hubs through which said drive screws are axially threaded, said drive coupler means comprising rotatable members abuttingly engaged by said drive hub for rotating with said drive hubs as they are alternately reciprocated.

3. The combination of claim 2, in which said rotatable members comprise star gear pinions, said power take off comprising a sun gear interengaged with said star gears.

4. The combination as claimed in claim 3, in which said power take off comprises a fly weight for smoothly effecting rotary movement to said power take off as the power screws are alternately reciprocated.

5. The combination of claim 4, including one way clutch means interposed between said power screw and said drive hub.

* * * * *